(12) United States Patent
Clouqueur et al.

(10) Patent No.: US 11,416,253 B2
(45) Date of Patent: Aug. 16, 2022

(54) MULTIPLE-TABLE BRANCH TARGET BUFFER

(71) Applicant: ADVANCED MICRO DEVICES, INC., Santa Clara, CA (US)

(72) Inventors: Thomas Clouqueur, Boxborough, MA (US); Anthony Jarvis, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 44 days.

(21) Appl. No.: 16/926,339

(22) Filed: Jul. 10, 2020

(65) Prior Publication Data
US 2020/0341770 A1    Oct. 29, 2020

Related U.S. Application Data

(62) Division of application No. 16/030,031, filed on Jul. 9, 2018, now Pat. No. 10,713,054.

(51) Int. Cl.
*G06F 9/30* (2018.01)
*G06F 9/38* (2018.01)

(52) U.S. Cl.
CPC ........ *G06F 9/3806* (2013.01); *G06F 9/30058* (2013.01)

(58) Field of Classification Search
CPC .................. G06F 9/3806; G06F 9/30058
See application file for complete search history.

(56) References Cited

U.S. PATENT DOCUMENTS

| | | | |
|---|---|---|---|
| 6,256,729 | B1 | 7/2001 | Cherabuddi et al. |
| 6,609,194 | B1 | 8/2003 | Henry et al. |
| 2005/0144427 | A1 | 6/2005 | Col et al. |
| 2011/0093658 | A1 | 4/2011 | Zuraski, Jr. et al. |
| 2012/0324209 | A1 | 12/2012 | Tran et al. |

(Continued)

FOREIGN PATENT DOCUMENTS

| | | |
|---|---|---|
| CN | 1725175 A | 1/2006 |
| CN | 102662640 A | 9/2012 |

(Continued)

OTHER PUBLICATIONS

International Search Report and Written Opinion for International Application No. PCT/US2019/040497, dated Oct. 24, 2019, 13 pages.

(Continued)

*Primary Examiner* — Corey S Faherty

(57) ABSTRACT

A processor includes two or more branch target buffer (BTB) tables for branch prediction, each BTB table storing entries of a different target size or width or storing entries of a different branch type. Each BTB entry includes at least a tag and a target address. For certain branch types that only require a few target address bits, the respective BTB tables are narrower thereby allowing for more BTB entries in the processor separated into respective BTB tables by branch instruction type. An increased number of available BTB entries are stored in a same or a less space in the processor thereby increasing a speed of instruction processing. BTB tables can be defined that do not store any target address and rely on a decode unit to provide it. High value BTB entries have dedicated storage and are therefore less likely to be evicted than low value BTB entries.

16 Claims, 7 Drawing Sheets

(56) References Cited

U.S. PATENT DOCUMENTS

2013/0339691 A1  12/2013  Bonanno et al.
2018/0060073 A1  3/2018  Havlir

FOREIGN PATENT DOCUMENTS

CN    104335168 A    2/2015
CN    106681695 A    5/2017

OTHER PUBLICATIONS

International Preliminary Report on Patentability dated Jan. 21, 2021 for International Application No. PCT/US2019/040497.
Extended European Search Report dated Feb. 3, 2022 for European Application No. 19834916.9, 11 pages.
First Office Action dated Sep. 18, 2021 for Chinese Application No. 201980052180.9, 14 pages.
Chinese Office Action dated Apr. 20, 2022 for Chinese Application No. 201980052180.9, 8 pages.

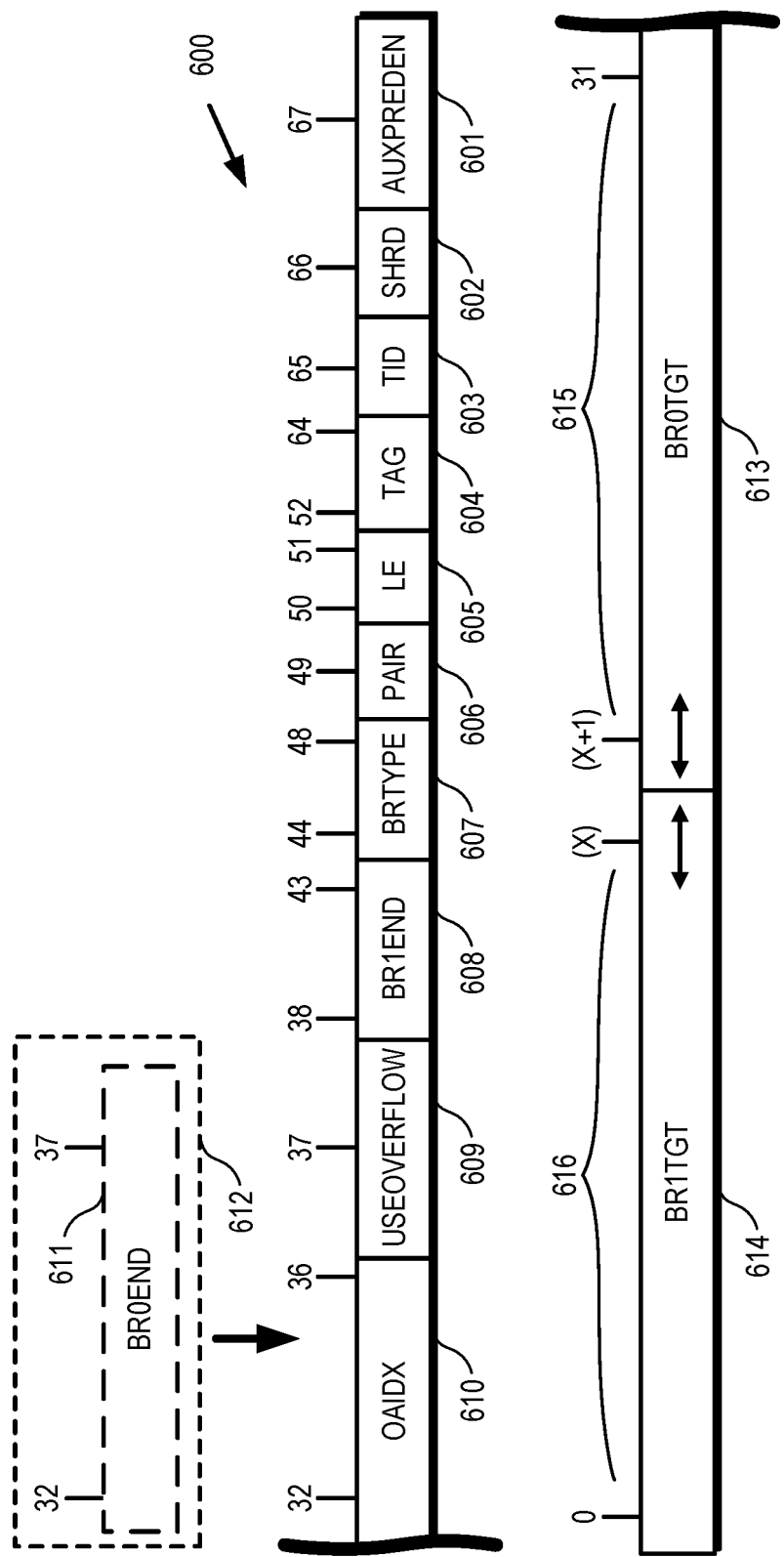

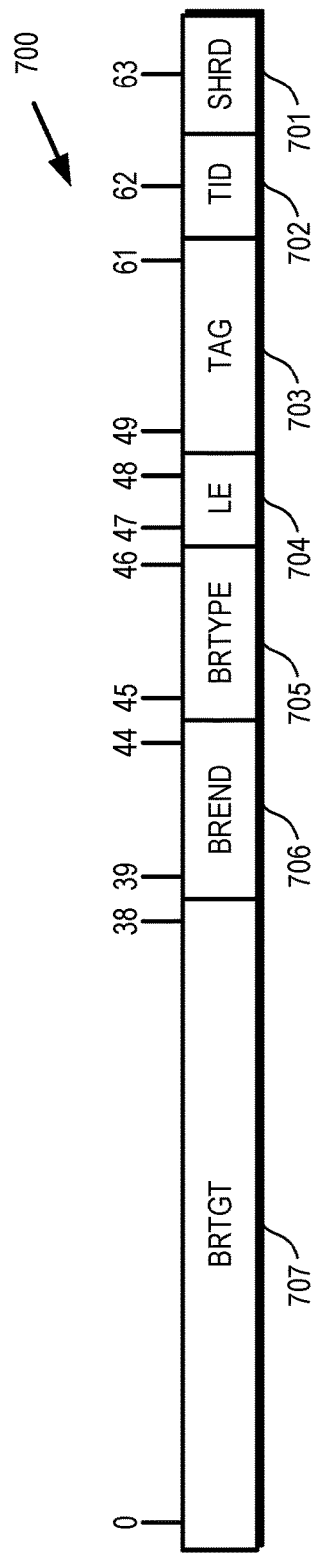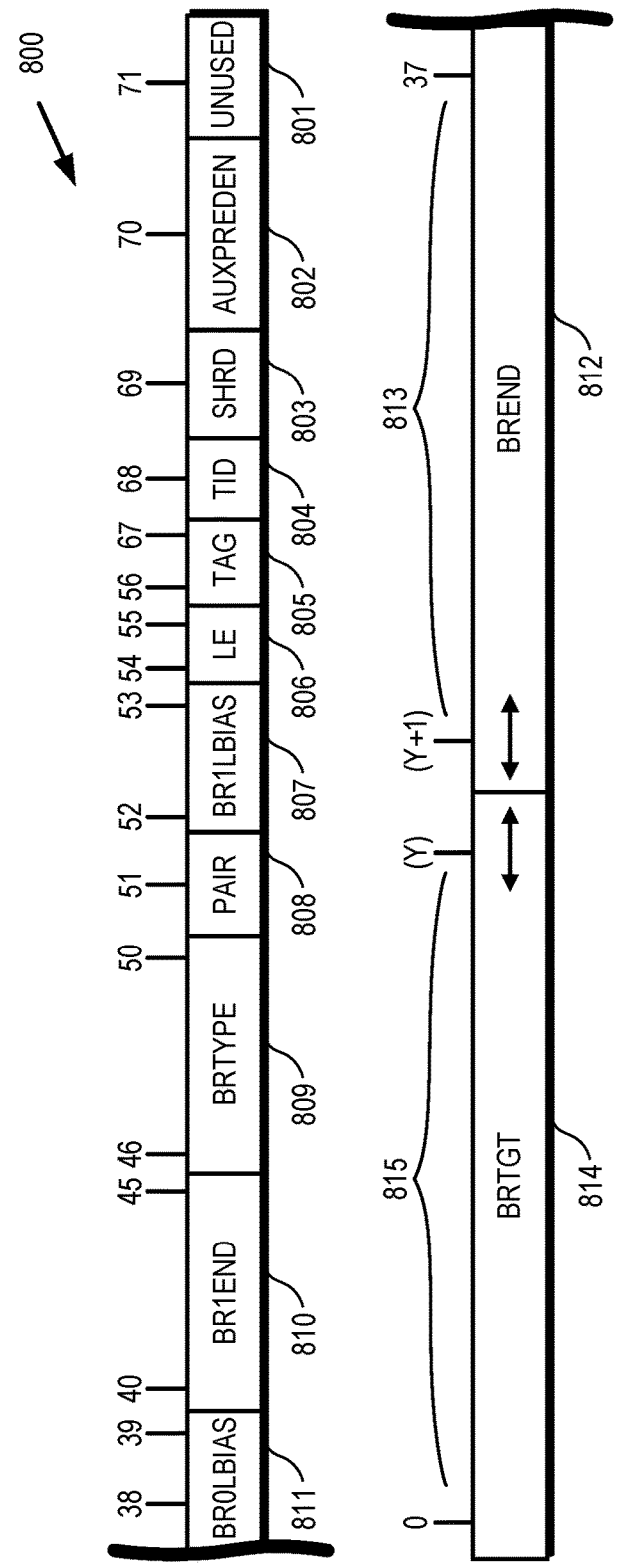

MULTIPLE-TABLE BRANCH TARGET BUFFER

BACKGROUND

An instruction pipeline in a processor improves instruction execution throughput by processing instructions at multiple pipeline stages in which different instructions of an instruction stream can be executed in parallel. Such pipelines often include separate units for fetching, decoding, mapping, and executing instructions, and then writing results to another unit, such as a register. An instruction fetch unit of the pipeline provides a stream of instructions to the next stage of the processor pipeline. Instruction fetch units generally use an instruction cache in order to keep the rest of the pipeline continuously supplied with instructions.

A branch instruction in an instruction stream may result in a pipeline stall if the processor waits until the branch is resolved in an execution stage in the pipeline before fetching a next instruction in an instruction fetching stage. A branch predictor may attempt to predict whether a conditional branch will be taken or not taken. In some implementations, a branch predictor uses branch target prediction to predict a target of a taken conditional or unconditional branch before the branch instruction is computed by decoding and executing the branch instruction itself. A branch target may be based on an offset from a computed address or an indirect reference through a register.

A branch target buffer (BTB) conventionally is a single small memory cache in a processor that stores branch information including predicted branch targets. Prediction involves comparing an instruction address against previously executed instruction addresses that have been stored in the BTB. Prediction usually saves time in processing because successful prediction allows the processor to skip execution of steps for acquiring a target address. A processor saves time by looking up an address for a next step of execution in the BTB. Accordingly, a frequency with which a BTB generates a hit for the target address directly impacts the speed with which instructions can be executed by the processor. Often, the speed of execution is directly related to the number of entries a BTB can store.

CROSS-REFERENCE TO RELATED APPLICATIONS

The present application is a Divisional application of U.S. patent application Ser. No. 16/030,031, entitled "MULTIPLE-TABLE BRANCH TARGET BUFFER", and filed on Jul. 9, 2018, the entirety of which is incorporated by reference herein.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 6 is a block diagram of a BTB entry for a BTB table according to some embodiments.

FIG. 7 is a block diagram of a BTB entry for a BTB table according to some embodiments.

FIG. 8 is a block diagram of a BTB entry for a BTB table according to some embodiments.

DETAILED DESCRIPTION

Figure 1:
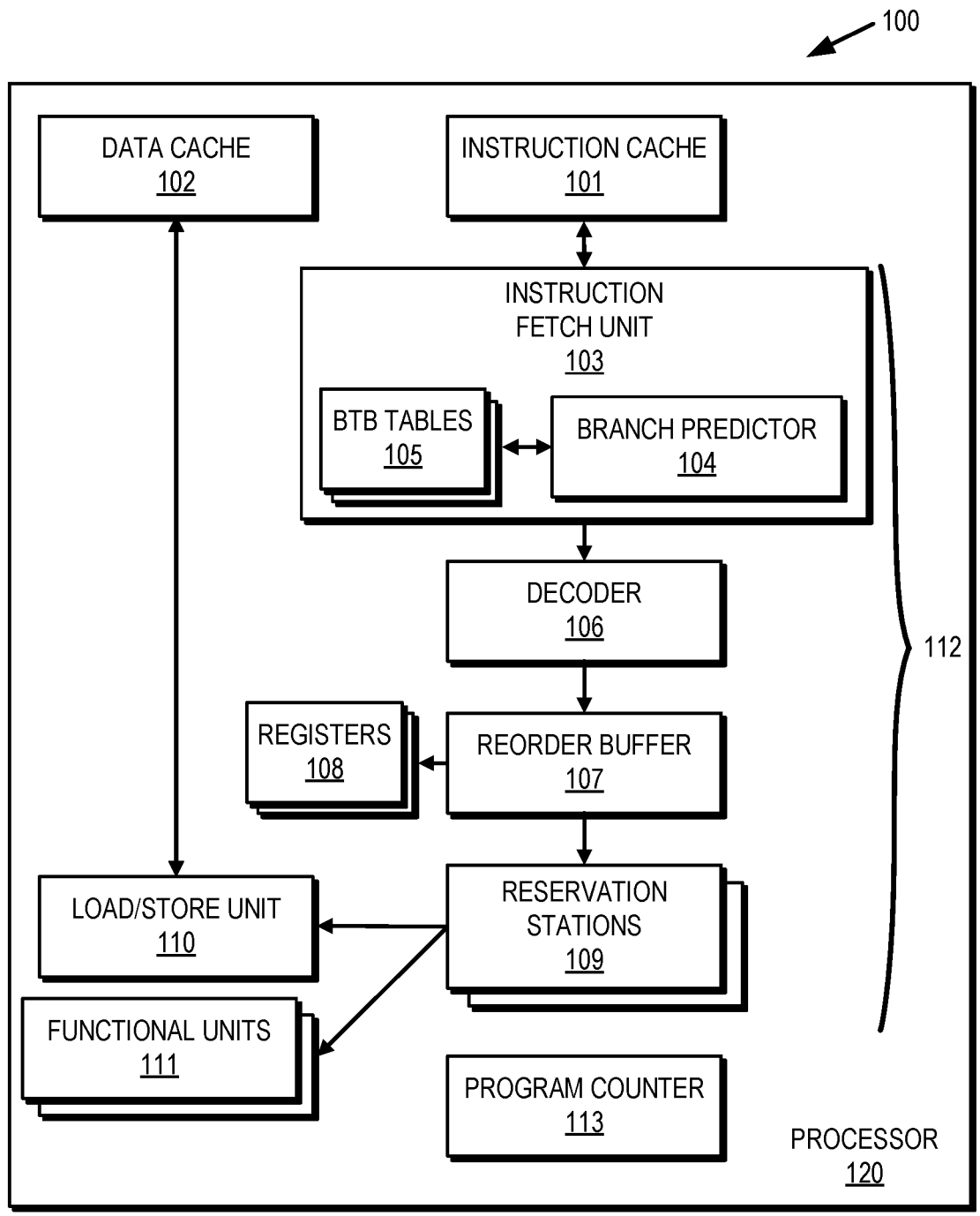
FIG. 1 is a block diagram of an instruction pipeline architecture in accordance with some embodiments.

The use of a branch target buffer (BTB) or BTB table in a processor to store branch information substantially improves processor speed. Conventionally, the only way to increase a number of entries in the BTB was to increase the size of the buffer. However, there are limits to the number of storage elements within a processor including limits to the capacity of the BTB because increasing local storage for some components such as the BTB come at the cost of other components in terms of speed and physical space in the processor. Further, there are tradeoffs to balance and factors to consider when designing an architecture of a processor. For example, some changes to the BTB actually have led to a slower processor when the processor is put into operation. In other circumstances, a larger BTB leads to overall higher power consumption during operation of the processor, which is undesirable.

A typical size of a conventional BTB is 1024 entries, with each entry having, for example, 20 bits for a target address. However, not every BTB entry needs a same number of bits for an address to be saved therein. For example, the branch predictor may only need 5-10 bits of 20 available bits for certain addresses but may need the full 20 bits for other addresses since part of the most significant bits of target address can be encoded in the branch information as unchanged from the prediction address. In order to increase the capacity and utility of the BTB, and to keep the footprint of the BTB within the processor about the same, in at least one embodiment the BTB is split into two or more buffers or tables. According to certain embodiments, a first buffer is sized and designated for short memory addresses such as those addresses with 6, 8, or other number of bits. A second buffer is sized and designated for longer memory addresses such as those with 14, 16, 18, or 20 bits. Some implementations utilize a third buffer, which is sized and designated for a variety of memory address lengths, such as those with 6, 8, 10, 12, 14, 16, 18, or 20 bits. Each BTB entry also includes a tag field and, in some embodiments, other information placed into one or more separate fields in a BTB entry.

According to other embodiments, processor designers and architects create and designate multiple BTB tables based on one or more types of instruction branch and thereby create BTB tables for respective types of branch targets. Each BTB entry has a value related to the cost of discovering the branches tracked by the BTB entry. Unconditional branches can be discovered early in a processor pipeline by a processor decoder, while conditional branches may not be discovered until execution time. Some embodiments of processors deliver two or more branch predictions, and thereby two branch target addresses, in one cycle. These multiple branches are stored in a single BTB entry. To account for the various values of a BTB entry, a first BTB is, for example, created and designated for unconditional branches, and a second BTB is, for example, created and designated for single conditional branches, and a third BTB is, for example, created for entries that record multiple branches. Each of the first, the second, and the third BTB tables may have a different target address size and thus a different overall BTB table width, thereby providing a mechanism to reduce an overall footprint of the BTB tables in a processor compared to previous designs where a single BTB was of a certain fixed width and a certain fixed length (number of entries). This benefit of dividing or placing BTB entries into two or more BTB tables allows a processor designer to increase or decrease the length of one or more of the BTB tables relative to each other or to a conventional length of a single conventional BTB. For a three-BTB system, the first, second, and third BTB tables may be supplemented by a separate target table that each BTB entry can point into in order to provide a number of additional address bits for large target addresses that do not fit in an entry in the respective first BTB, second BTB, and third BTB. In operation, and according to some implementations, a BTB lookup in the processor is performed across all BTB buffers for each BTB lookup, thereby providing a similar performance as with a single conventional BTB buffer.

In certain implementations, the BTB tables are included within a single memory type or, whereas in other implementations the BTB tables are distributed across multiple memories, multiple memory types, or multiple memory levels of a multi-level memory hierarchy with respect to a processor core. For sake of simplicity of description, reference is made herein to a level 1 BTB, a level 2 BTB, and so forth, each corresponding to a level or placement of memory relative to a processor core or relative to a processor. Each BTB level may include a single BTB table or multiple BTB tables. In other implementations, one or more BTB tables are built in a single memory cache or memory level for a single processor core. In yet other implementations, BTB tables are shared across processor cores or processor operations. In a particular embodiment, one of a plurality of BTB levels is shared by a plurality of processor cores where each of the processor cores includes its own one or more BTB tables. Those BTB tables associated with a particular core may be used first, and BTB entries may be evicted into a shared BTB table as needed. The benefits of a processor having one or more BTB tables shared across processor cores can be offset by a reduction in search speed, overall processor speed, and overall processor operation. Accordingly, multiple BTB tables may be provided to each separate processor core of a multi-core processor for a fast implementation.

In operation, lower value BTB entries, such as those that are least recently used (LRU), are first evicted from a first BTB or a first BTB level to another BTB or BTB level, such as a BTB in a same or in another level of memory. Eviction from a second BTB to a third BTB is also done on an LRU basis. Various types of associativity may be used for the BTB tables. By way of example, a first BTB table is four-way set associative. Another BTB table takes the form of an eight-way set associative processor cache with each way storing 512, 1024, 2048, or some other number of entries per way. Generally, a first BTB table can be N-way set associative, and a second BTB table can be M-way set associative with N and M being integers which are the same or different than each other. In other embodiments, one or more of the BTB tables are fully associative. A level of associativity is selected depending on a desired level of power consumption for a particular processor, a system in which the processor operates, and expected types and amounts of processing loads for the particular processor.

In some implementations, a BTB table serves as a victim buffer which has a limited number of entries that are populated with recently evicted entries for conditional branches from lower level BTB tables. In order to maximize the number of entries of such a victim buffer for a given area, the branch predictor does not record any target address in the BTB table. When the branch predictor finds a branch in the victim buffer and predicts that the branch is taken as determined by the conditional branch predictor, the branch predictor sends the information about the branch location to the decode unit which triggers a redirect to the target address available once the decode operation is completed and which confirms that the location predicted is indeed a conditional branch.

FIG. 1 is a block diagram of an instruction pipeline architecture 100 of a processor 120 implementing out-of-order instruction execution in accordance with some embodiments. Only a few elements of the processor 120 are illustrated. An instruction cache 101 is accessed by an instruction fetch unit 103. A data cache 102 is accessed by a load/store unit 110. Instructions of the instruction cache 101 operate on data including the data from the data cache 102. The instruction fetch unit 103 includes a branch predictor 104 that generates branch target addresses that are stored or provided to one or more branch target buffer (BTB) tables (also commonly referred to as BT buffers and BTBs) 105. According to some embodiments, the branch target addresses are relative to a program counter 113. While BTB tables 105 are shown internal to the branch predictor 104 in FIG. 1, the BTB tables 105 may or may not be located in the processor 120 proximate to certain elements of the branch predictor 104 or instruction fetch unit 103. A decoder 106 converts instructions including those from the instruction cache 101 into processor control signals.

A reorder buffer 107 stores instructions in their original fetch order in registers 108 that are accessed by other components of the processor such as reservation stations 109. The reservation stations 109 rename registers such as registers 108 and facilitate dynamic instruction scheduling. The reservation stations 109 permit the processor to fetch and re-use data as soon as the data have been fetched or computed, rather than waiting for the data to be stored in a register and re-read. When a prediction address stored in the BTB tables 105 by the branch predictor 104 is not correct or a nonrecoverable exception is encountered in the instruction stream, the reorder buffer 107 is cleared of all instructions and reservation stations 109 are re-initialized. The reorder buffer 107 provides a mechanism for rollback control of branch target address mispredictions. The reservation stations 109 provide information to the load/store unit 110 and one or more functional units 111, such as an arithmetic logic unit (ALU), a floating point unit (FPU), and an integer unit (IU). Together, the instruction fetch unit 103, the decoder 106, the reorder buffer 107, the reservation stations 109, load/store unit 110 and related registers are one embodiment of an instruction execution pipeline.

Figure 2:
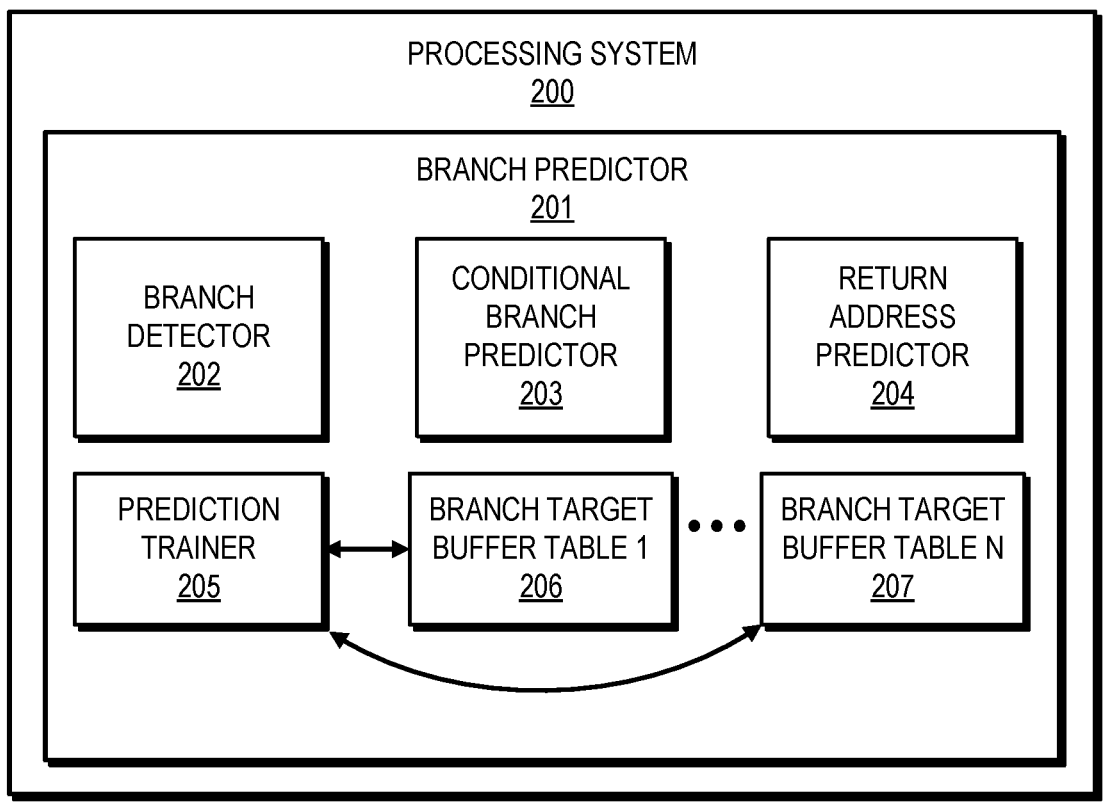
FIG. 2 is a block diagram of a processing system in accordance with some embodiments.

FIG. 2 is a block diagram of a processing system 200 in accordance with some embodiments. The processing system 200 is an example of a portion of the instruction pipeline architecture 100 and BTB tables 105 of FIG. 1. The processing system 200 includes a branch predictor 201 having a branch detector 202, a conditional branch predictor 203, a return address predictor 204, and a branch prediction trainer 205. The processing system 200 includes other non-illustrated elements such as arithmetic units, schedulers, table walkers, and so forth as understood by those in the art.

For each current address, the branch predictor 201 provides a prediction window including the end address of the block of bytes to be fetched starting at the current address, the type of branch in the predicted block, and the starting address of the next prediction. To determine which branches are part of the prediction window, the branch detector 202 looks up in all the BTB tables across all the ways such as across one or more of a plurality of BTB tables represented as BTB table 1 206 through BTB table N 207. A tag match on a given BTB entry indicates that the branch or branches recorded in the entry are present in the prediction window. Each BTB entry includes the position and type of branches. The BTB is populated by the branch prediction trainer 205 when redirects occur for branches that were mispredicted.

Figure 3:
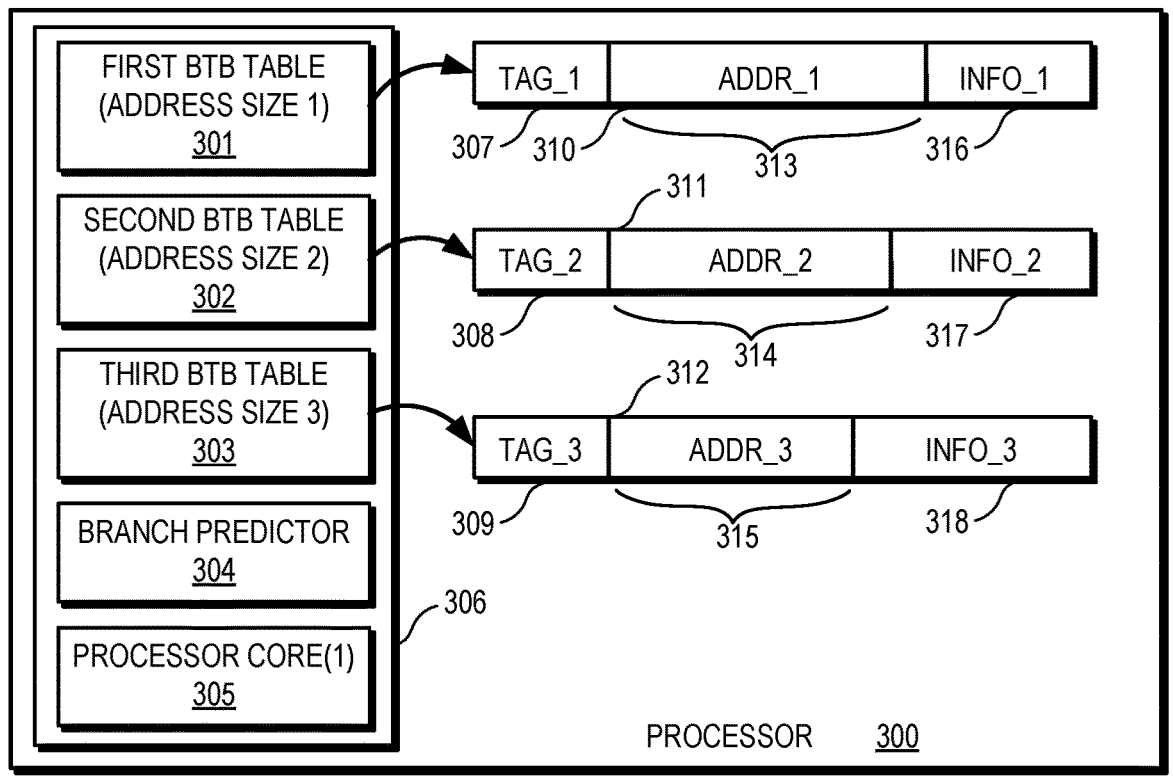
FIG. 3 is a block diagram of a processor having multiple branch target buffer (BTB) tables based on target size in accordance with some embodiments.

FIG. 3 is a block diagram of a processor having multiple BTB tables in accordance with some embodiments. The processor 300 is a specific example of the processor 120 and BTB tables 105 of FIG. 1 including additional structures and features. A processor 300 includes a first processor core 305 of a plurality of processor cores in a first designated area 306. The first processor core 305 interoperates with the BTB tables, which include a first BTB table 301, a second BTB table 302 and a third BTB table 303 that are used by a branch predictor 304. According to some embodiments, each process cycle, the branch predictor 304 provides one or two predictions from one or more branch instructions.

Each BTB table 301, 302, 303 includes a tag field 307, 308, 309, respectively, used to identify which prediction address the entry belongs to, a target address field 310, 311, 312 used to store a target of one or a plurality of branches, and an information field 316, 317, 318 used to store the position of branches in the prediction window and the branch type. A branch trainer, such as the branch prediction trainer 205 of FIG. 2, populates the respective BTB tables and determines for each BTB entry being trained whether the BTB entry is recorded into the first BTB table 301, the second BTB table 302, or the third BTB table 303.

Each of the BTB tables 301-303 has target address fields 310, 311, 312 of different sizes or widths 313, 314, 315 (unless otherwise indicated, "size" and "width" are used interchangeably herein). For example, the second BTB table 302 has addresses 311 of a second address size 314. According to some embodiments, the second address size 314 is smaller than the first address size 313. The second address size 314 is larger than the third address size 315 of the target address field 312 of the third BTB table 303. In certain embodiments, there are a greater number of BTB entries in the third set of BTB entries of the third BTB table 303 compared to, for example, a number of BTB entries in the first set of BTB entries of the first BTB table 301. This is possible because reducing a number of bits or width 315 for the target address field 312 allows a greater number of entries for the third BTB table 303 when holding constant the sizes of the other fields 309, 318. That is, for a same amount of processor footprint for each BTB table 301, 302, 303, a reduced width 315 allows the third BTB table 303 to have a greater number of entries for a fixed size of the designated area 306. In other embodiments, a smaller designated area 306 is possible relative to previous embodiments with a single BTB table having a target address field of constant width for all target addresses. Accordingly, in this example, the third BTB table 303 is considered larger in size (entries) than the second BTB table 302 and the first BTB table 301 even though the third BTB table 303 may take up a smaller footprint in the processor 300 and designated area 306 than the other BTB tables 301, 302.

When extra bits are needed to hold address bits, such as in the third address 312 of an entry in the third BTB table 303 or the second address 311 of an entry in the second BTB table 302, an extra address table (not illustrated in FIG. 3) is shared between the first, second, and third BTB tables 301, 302, 303. When the extra address table is used, instead of address values stored in the bits of the address field, a plurality of address bits is indexed to an entry in the extra address table. That is, a pointer to an entry of the extra address table is stored in at least a portion of the BTB entry that is designated for the corresponding one of the branch target address fields 310, 311, 312.

Figure 4:
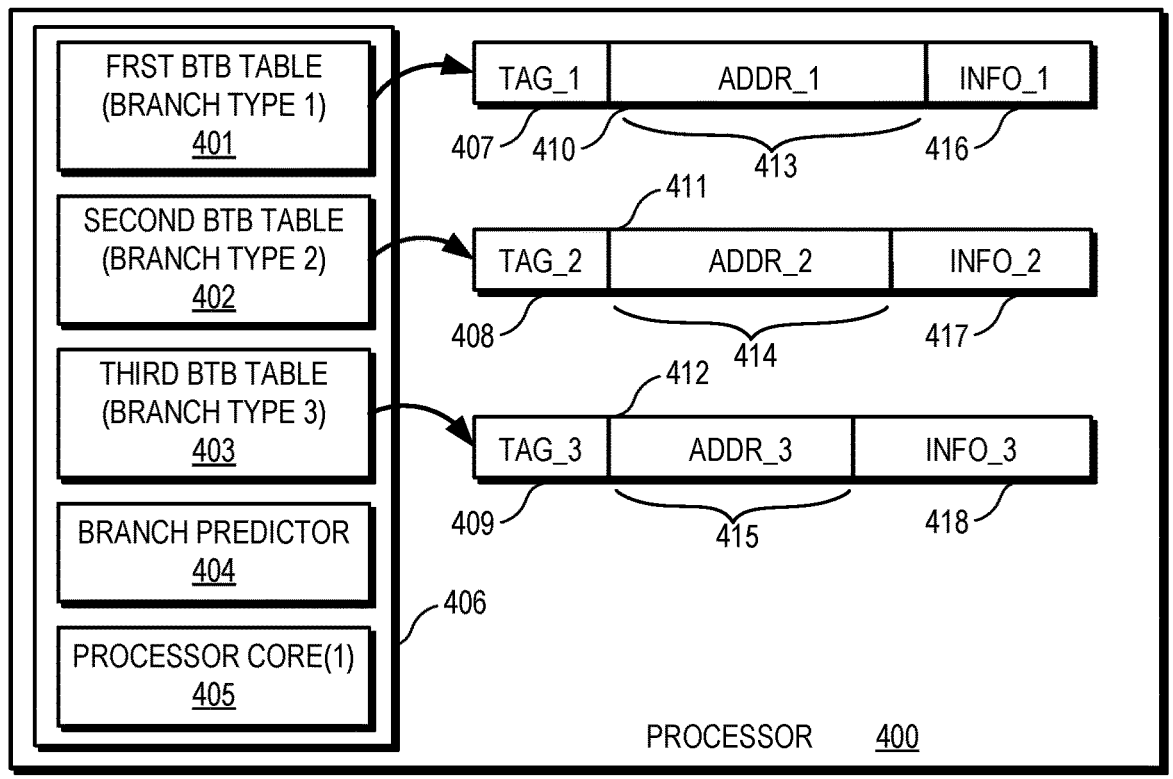
FIG. 4 is a block diagram of a processor having multiple BTB tables based on branch types in accordance with some embodiments.

FIG. 4 is a block diagram of a processor 400 having BTB tables based on branch types in accordance with some embodiments. The organization of BTB tables based on branch types provides improved performance by dedicating tables to BTB entries of different value and properly sizing the tables to dedicate more space to higher value entries. The processor 400 is a specific example of the processor 120 and BTB tables 105 of FIG. 1 including additional structures and features. The processor 400 includes a first processor core 405 of a plurality of processor cores in a first designated area 406. The first processor core 405 interoperates with the BTB tables, which include a first BTB table 401, a second BTB table 402 and a third BTB table 403 that are used by a branch predictor 404. According to some embodiments, each process cycle, the branch predictor 404 provides one or two predictions from one or more branch instructions.

Each BTB table 401, 402, 403 includes a tag field 407, 408, 409 used to identify which prediction address the entry belongs to, a target address field 410, 411, 412 used to store a target of one or a plurality of branches, and an information field 416, 417, 418 used to store the position of branches in the prediction window and the branch type. A branch trainer, such as the branch prediction trainer 205 of FIG. 2, populates the respective BTB table and determines for each BTB entry being trained whether the BTB entry is recorded into the first BTB table 401, the second BTB table 402, or the third BTB table 403. Further, each of the BTB tables 401-403 has target address fields 410, 411, 412 for respective types of branching. Each of the BTB tables 401-403 may have target address fields 410, 411, 412 of different sizes or widths 413, 414, 415 based on target address sizes typical for the respective type or types of branch addresses stored therein. Each of the BTB tables 401, 402, 403 is designated for one or more branch types. For example, the second BTB table 402 stores addresses 411 for a different branch type than the entries of the first BTB table 401. In certain embodiments, there are a greater number of BTB entries in the third set of BTB entries of the third BTB table 403 compared to, for example, a number of BTB entries in the set of BTB entries of the second BTB table 402 because the type of entries in the third BTB table 403 are more beneficial to operational efficiency of the processor 400 in terms of number of cycles saved when correctly predicting with the BTB entry. Sizes (number of entries) of respective BTB tables 401-403 are selected and the BTB tables 401-403 are built based on the branch address types to be stored therein and the operational efficiencies thereof relative to one another. In one embodiment, each BTB entry includes at least a tag and a target address in respective fields. Each entry may also include other information such as a thread ID and a share indicator or flag.

Figure 5:
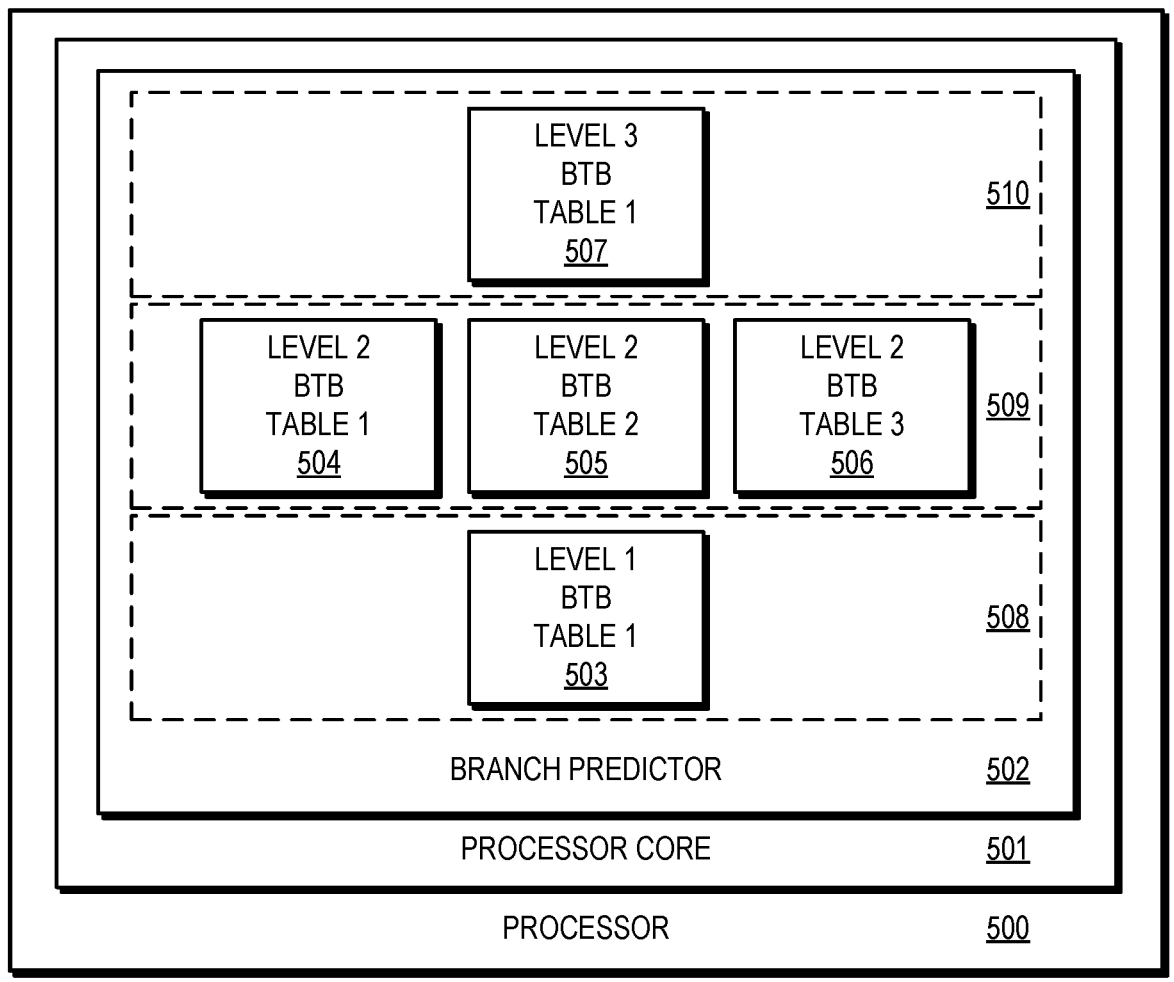
FIG. 5 is a block diagram of a processor having multiple BTB tables in different levels of memory in accordance with some embodiments.

FIG. 5 is a block diagram of a processor having multiple BTB tables in different levels of memory in accordance with some embodiments. A processor 500 includes a processor core 501, which includes a branch predictor 502 that processes branch instructions. The branch predictor 502 includes and interoperates with various structures including a level 1 BTB table 503, a set of level 2 BTB tables 504, 505, 506, and a level 3 BTB table 507. The level 1 BTB table 503 is in a first level memory 508. The level 2 BTB tables 504, 505, 506 are in a second level memory 509. The level 3 BTB table 507 is in a third level memory 510. According to some embodiments, when a set of the level 1 BTB table 503 is full or that all sets of BTB entries are full, a BTB entry is overwritten or evicted from the level 1 BTB table 503 into one of the plurality or set of level 2 BTB tables 504-506. Each of the level 2 BTB tables 504-506 is created for a particular target address size or range of target address sizes or for a particular branch instruction type as described in relation to other figures.

When one of the level 2 BTB tables 504, 505, 506 is full, the processor 500 overwrites a BTB entry therein or evicts a BTB entry therefrom into the level 3 BTB table 507 in the third level memory 510. In some embodiments, a BTB entry such as a least valuable entry is overwritten. In other embodiments, a BTB entry is evicted to one of one or more BTB tables not illustrated. Such other BTB table may be in a same or different memory such as a BTB table in another level of memory 508-510, or in another location in the processor, or in a memory outside of the processor core 501, or the processor 500 itself such as in a memory coupled to the processor 500 by a bus or bridge. For example, eviction is to an overflow BTB table in a level 2 memory 509. According to some embodiments, only a subset of BTB entries is allowed to be evicted such as only those BTB entries in one BTB table 504, 505, 506 based on the branch type or branch target address size.

According to an illustrative embodiment, each of the level 2 BTB tables 504, 505, 506 are in a level 2 memory 509. In some embodiments, each of the BTB tables 504, 505, 506 include 1,024 entries that are four-way associative. Each BTB entry is 68 bits (68b) in size, and can record a target size of up to 37 bits. Targets of sizes larger than 37 bits can be recorded through a level of indirection into a separate table. The sizes described herein are illustrative of a variety of sizes possible such as for the BTB tables 301-303 of FIG. 3, BTB tables 401-403 of FIG. 4, and the BTB tables 503-507 of FIG. 5. In some embodiments, the BTB tables are indexed and tagged using a hash of a virtual fetch address.

According to some embodiments, the BTB tables support prediction of up to two branches per branch prediction cycle; in other embodiments, only one branch is evaluated per process cycle or branch prediction cycle. Preferably, the BTB tables support all branch types and target sizes. Each BTB entry such as those entries in the level 1 BTB table 503 of FIG. 5 stores up to two targets and accompanying branch information for the prediction block starting at the prediction address and extending to the end of the aligned 64B, or the end of a first static branch, or an end of a first dynamic branch or branch pair "non-last" in a prediction window (NLIPW), whichever comes first.

According to some embodiments and depending on processor design, each entry in the BTB tables includes certain fields. To illustrate, FIG. 6 is a block diagram of a BTB entry 600 for a BTB table according to some embodiments. In FIG. 6, the following is a description of fields at the respective position bits within the BTB entry 600 for 68-bit entries for a BTB table, each BTB entry 600 having 68 bits indexed from zero (0) to 67. The sizes or number of bits are by way of example only, and other sizes and bit distributions may be implemented using the guidelines provided herein. AUXPREDEN 601 is one bit at position [67] and indicates enablement of auxiliary predictors. SHRD 602 is one bit at position [66] indicating whether the entry is shared or sharable among threads. TID 603 is one bit at position [65] and indicates a thread identifier (ID). TAG 604 is 13 bits located at position [64:52] and stores the tag for the branch entry. LE 605 is two bits at position [51:50] and indicates an encode length or "length encode." The LE 605 states include states with these values: 1,1; 1,0; and 0,1. PAIR 606 is one bit at position [49] and indicates pairing with an overflow address buffer. BRTYPE 607 is 5 bits located within position [48:44] and indicates branch type encoding as described in greater detail below. BR1END 608 is 6 bits located at position [43:38] and indicates a Branch1 end pointer that may be incremented by one with a range of [5:0].

The states of LE 605 and PAIR 606 together indicate how bits at position [37:0] of each (first level or second level) BTB entry are used. USEOVERFLOW (USEOA) 609 is one bit at position [37] and refers to use of the overflow address buffer. For example, a target located at position [48:32] comes from the overflow address buffer entry pointed to by way of an overflow address identifier OAIDX 610 (see below) and is used when PAIR=0. OAIDX 610 is 5 bits located at position [36:32] and refers to index of the overflow address buffer. The OAIDX 610 is used when PAIR=0 and USEOA=1. BROEND 611 is an alternative allotment 612 of six bits at position [37:32] and indicates a Branch0 end pointer that may be incremented by one with a range of [5:0].

BR0TGT 613 is the Branch0 target or first branch target address over a first range 615 from index (X+1) to 31 where X is an integer and the first branch target address is of a variable length depending on the state of the two bits of LE 605. For example, BROTGT 613 is 12 bits at position [31:20] for LE=1,1; BROTGT 613 is 16 bits at position [31:16] for LE=1,0; and BROTGT 613 is 20 bits at position at [31:12] for LE=0,1. BROTGT 613 is not valid or not used when LE=0,0.

BR1TGT 614 is the Branch1 target or second branch target address over a second range 616 from position index [0] to position index [X] where X is an integer. For example, BR1TGT 614 is 37 bits at position [36:0] when PAIR=0 and USEOA=0; BR1TGT 614 is 32 bits at position [31:0] when PAIR=0 and USEOA=1; BR1TGT 614 is 20 bits at position [19:0] when PAIR=1 and LE=1,1 (BROTGT 613 is 12 bits as above); BR1TGT 614 is 16 bits at position [15:0] when PAIR=1 and LE=1,0 (BROTGT 613 is 16 bits as above); and BR1TGT 614 is 12 bits at position [11:0] when PAIR=1 and LE=0,1 (BROTGT 613 is 20 bits as above). In this way, each level 1, level 2, or level 3 BTB entry of BTB tables is capable of storing two branch target addresses BROTGT 613 and BR1TGT 614 according to some embodiments.

With respect to branch type encoding, according to some embodiments, a 5-bit branch type indicates the following properties of Branch1. For the first two bits of the five branch type bits, a branch type for each branch instruction is specified at position [1:0] as follows: a first state with values 0,0 corresponds to Invalid; a second state with values 0,1 corresponds to JMP (jump type); a third state with values 1,0 corresponds to CALL (call type); and a fourth state with values 1,1 corresponds to RET (return type). At position [2] of the 5-bit branch type, a bit designates a fixed target for value 0 and a variable target for a value 1. Branches are installed as fixed targets by default and only indirect branches get converted to a variable target if the branches ever get a target different than the one initially installed into the BTB entry.

For the last two bits of the 5-bit branch type, a directionality status is provided at position [4:3] according to the following scheme. Direct and indirect fixed branches are distinguished by looking at position [4:3]. The values of 0,0 correspond to an unconditional direct (UD) that is found through a DE (decode) redirect. According to some embodiments, the UD is static and fixed by definition. A distinction is needed for UD in order to know which table of the level 2 BTB the branch belongs to. The values of 1,0 at position [4:3] corresponds to not UD, static. Branches are installed as static in terms of direction by default and only conditional branches get converted to a dynamic direction if the conditional branches are redirected as not taken.

The values of 1,1 at position [4:3] correspond to a state of "not UD, dynamic, Last In Prediction Window (LIPW)." LIPW is set for any branch that a processor identifies as a last branch in a 64B cache line. This status helps BTB read logic decide a next fetch address (FA) in case none of the branches are taken in the BTB entry. If LIPW is set (and assuming none of the branches is taken), then the next FA is a sequential cache line address, otherwise the next FA is the address of instruction immediately after the last branch in the BTB entry. The state of values of 0,1 at position [4:3] corresponds to "not UD, dynamic NLIPW."

Since branch target pairing only has a value when the first branch can be predicted not-taken, Branch0 can only be a dynamic fixed JMP type of branch. In one embodiment, branch target pairs have the following properties. Only one branch per pair can be of variable target. Pairs cannot include Call/Call, Call/Ret, Ret/Call or Ret/Ret. Pairs support multiple target size combinations as described previously. In order to know whether pairing is possible and which combination to use, a single type differentiates between short, medium, and long branch prediction targets. That distinction is also used to select which BTB table of the BTB tables to use when victimizing or evicting branch target addresses from another BTB table such as to an overflow level 2 BTB table or level 3 BTB table.

The following description provides further detail in relation to the first BTB branch target address bits of first BTB tables such as BTB tables 401, 402, 403 of FIG. 4 and BTB tables 503-507 of FIG. 5 according to an illustrative embodiment. According to some embodiments, 32 bits for a target field are needed in order to store two branches worth of target addresses and to cover many of the possible cases for the two branches such as based on branch type. A target size needed varies from 1 bit to 49 bits across direct branches, while return type branches do not need any target bits. For variable target branches, the first target encountered is trained as further described herein in the BTB and other targets are trained in the indirect target predictor.

The target field is shared between targets, each usually having a different length when the entry stores two branch target addresses. Since implementing variable length branches would be too costly from a timing perspective, a more optimized approach to store targets is to use three target length variations for the two branches and encoding using a branch type such as the jump, call, and return types in respective BTB tables such as BTB tables 401, 402, 403 of FIG. 4 and BTB tables 504, 505, 506 of FIG. 5. There are cases where the branch target is so big that its target cannot fit side by side with a target of a second branch. In such case, the branch requires its own BTB entry to store the complete target address or target bits. There are two cases: (1) a single branch per entry storage, the other branch type field and end field—as described above—is reused as target bits. This mechanism enables support for 37-bit target addresses; and (2) targets longer than 37 bits where the upper bits are provided by an overflow address entry pointed to by the OAIDX field. Redirects for target addresses that need the overflow address structure after hitting the first BTB incur an extra redirect penalty. By way of example for BTB replacement policies, according to some embodiments, a first BTB table 401 or BTB table 503 uses a round robin scheme as part of a replacement policy. Each of the 256 sets in the first BTB tables includes a two bit round-robin (RR) counter.

In terms of pipelining, such as in the instruction pipeline architecture 100 of FIG. 1, the processor 400 of FIG. 4, or the processor 500 of FIG. 5, the BTB table is read for every prediction flow unless the read is suppressed for power saving. According to some embodiments, the first BTB read is initiated in a first step designated BP0. Subsequent stages are designed as BP1, BP2, and so forth as stages in a prediction pipeline. The BTB table redirects from BP2 to BP0.

According to some embodiments of a processor, such as processor 400 of FIG. 4 and processor 500 of FIG. 5, there are three logical tables as embodied in the BTB tables 401, 402, 403 and tables 504, 505, 506 as described above. Each table of the BTB tables supports a subset of branch types as in FIG. 4 or target sizes as in FIG. 3. Such multi-table BTBs embodied in the BTB tables 401-403, 503-507 provide several benefits. For example, such arrangement is area-efficient in a processor. Each BTB table 401-403, 504-506 has only storage capacity for its branch type or target size subset. Each BTB table provides a high amount of associativity in some embodiments, but each BTB table 401-403, 504-506 can implement full-LRU in certain embodiments. Using high actual associativity is costly to implement. Use of multiple BTB tables separates higher value branches (e.g., paired and dynamic branches) from other branches. The multiple BTB tables 301-303, 401-403, 503-507 support an unlimited branch target size but only one BTB table of a plurality of BTB tables 301-303, 401-403 needs to support a full branch target address size. Use of multiple BTB tables facilitates processor floorplan flexibility. For example, only two of the BTB tables 401-403 need to support dynamic branches. Thus, these BTB tables can be placed close to a conditional predictor. In operation and according to certain embodiments of the processor, only two of the BTB tables drive a significant number of target address bits.

The following provides further details about an illustrative BTB organization and sizing scheme. A first BTB table (index 0), such as the first BTB table 401, stores small entries. A second BTB table (index 1), such as the second BTB table 402, stores branches discovered through DE redirects (e.g., those branches having a low redirect penalty). A third BTB table (index 2), such as the third BTB table 403, stores all other types. For example, branch types are allocated as follows. The first BTB table stores addresses for single RET branch types and single static fixed conditional JMP short branch types. The second BTB table stores single static fixed unconditional direct call not "extra-long" branch types and single static fixed unconditional direct jump not extra-long branch types. The third BTB table stores all other branch types. Other numbers of BTB tables and other type and target size allocations are possible beyond those described in relation to FIGS. 3-5.

An example of capacities of the BTB tables is as follows in an example implementation having a total of 5,632 BTB entries. The first BTB table has 512 sets and 4 ways for a total of 2,048 BTB entries. The first BTB entries have 36 bits per entry for a subtotal of 73,728 bits. The second BTB table has 256 sets and 4 ways for a total of 1,024 BTB entries. The second BTB entries have 64 bits per entry for a subtotal of 65,536 bits. The third BTB table has 512 sets and 5 ways for a total of 2,560 BTB entries. The third BTB entries have 72 bits per entry for a subtotal of 184,320 bits. In total, the set of BTB tables have 13 ways, 5,632 entries, and require 323,584 bits such as elements in one or more designated areas such as designated area 406 of FIG. 4.

In this example, for the multi table BTB tables, an overflow address buffer is shared between the set of multiple BTB tables 401-403 of FIG. 4 or the set of BTB tables 504-506 of FIG. 5. The branch type encoding is different between the first BTB table 401, 504, the second BTB table 402, 505, and the third BTB table 403, 506. However, there is a direct mapping between the BTB branch type defined according to {LE, PAIR, TYPE} and the BTB tables branch type described according to {TableNumber, LE, PAIR, TYPE}. These BTB descriptions (fields) are used during swaps and BTB evictions.

According to other embodiments, for fields and position bits for BTB entries in a first BTB table, such as for the first BTB table 401 of FIG. 4, these field and position bits include: UNUSED with two bits at position [35:34]; SHRD with one bit at position [33]; TID with one bit at position [32]; TAG with 12 bits at position [31:20]; BREND with six bits at position [19:14]; BRTYPE with two bits at position [13:12]; BRTGT with twelve bits at position [11:0]. The UNUSED field indicates whether there are unused bits in a corresponding macro location. The SHRD field indicates whether the BTB entry is shared or sharable among threads. The TID field is a thread ID. The BREND field is a branch end pointer may be incremented by one with a range of [5:0]. The BRTYPE field indicates a branch type encoding. According to some embodiments, the first BTB table 401 includes information for several types of branches including RET (return) type branches and at least one type of JMP branch. According to some embodiments, the BRTYPE field is encoded as follows: state 0,X (where X can be 0 or 1) corresponds to an invalid state, a state with values 1,0 corresponds to JUMP, and a state with values 1,1 corresponds to RET with BRTGT at position [4:0] recording a full branch type for the return type.

FIG. 7 is a block diagram of a BTB entry 700 for a second BTB table according to some embodiments. The following is a description of fields and position bits for BTB entries in the second BTB table such as the second BTB table 402 of FIG. 4 or the second BTB table 505 of FIG. 5. Each BTB entry 700 of FIG. 7 is 64 bits wide, which is shorter than the BTB entry 600 of FIG. 6. In FIG. 7, the BTB entry 700 includes the following fields: SHRD 701 with one bit at position [63]; TID 702 with one bit at position [62]; TAG 703 with thirteen bits at position [61:49]; LE 704 with two bits at position [48:47]; BRTYPE 705 with two bits at position [46:45]; BREND 706 with six bits at position [44:39]; BRTGT 707 with 39 bits at position [38:0]. SHRD 701 indicates whether the BTB entry is shared or sharable among threads. TID 702 is a thread ID. LE 704 refers to length encode and uses a same encoding as for the LE 605 of a first BTB table, such as the first BTB table 401. BRTYPE 705 indicates a branch type encoding. According to some embodiments, the second branch-type BTB includes information for just one branch type such as only unconditional direct branches. This field is for encoding a distinction between JMP, CALL, and invalid. The BRTYPE for the second branch-type BTB, according to some embodiments, is encoded as follows: a state with values 0,0 corresponds to an invalid state; a state with values 0,1 corresponds to a JMP (jump) branch type; state 1,0 corresponds to a CALL branch type; and a state with values 1,1 corresponds to another illegal state. BREND 706 for the second BTB entry 700 is a branch end pointer that is incremented by one with a range of [5:0]. The BRTGT 707 is the branch target following a same or similar format as for a first BTB entry 600. Branches that need extra bits of address available in the overflow address buffer are assigned to the third branch-type BTB as in a BTB entry 800 of FIG. 8. Consequently, a field of USEOA of 1 bit is not included in the second branch-type BTB according to some embodiments to accommodate the need for extra bits of address. As referred to herein, OA refers to an overflow address or particular fields, bits, or flags therein.

FIG. 8 is a block diagram of a third BTB entry 800 for a third BTB table according to some embodiments. The following is a description of fields and position bits for entries in the third branch-type BTB entry 800 such as for a BTB entry in the third BTB table 403 of FIG. 4 or the third BTB table 506 of FIG. 5. Each BTB entry 800 is 72 bits wide indexed from zero (0) to 71, and includes the following fields: UNUSED 801 with one bit at position [71]; AUXPREDEN 802 with one bit at position [70]. SHRD 803 with one bit at position [69]; TID 804 with one bit at position [68]; TAG 805 with twelve bits at position [67:56]; LE 806 with two bits at position [55:54]; BR1LBIAS 807 with two bits at position [53:52]; PAIR 808 with one bit at position [51]; BRTYPE 809 with five bits at position [50:46]; BR1END 810 with six bits at position [45:40]; and BR0LBIAS 811 with two bits at position [39:38]. A group of fields {BREND 812, BRTGT 814} are spread across respective variable length ranges 813, 815 at position [37:0]. For example, BREND 812 is positioned from (Y+1) to 37, and BRTGT 814 is positioned from 0 to (Y) where Y is an integer. UNUSED 801 indicates whether there are unused bits in a corresponding macro location. AUXPREDEN 802 indicates enablement of auxiliary predictors such as a loop exit predictor. SHRD 803 indicates whether the BTB entry is shared or sharable among threads. TID 804 is a thread ID. The LE 806 refers to length encode and uses a same encoding as for a same LE field of a first BTB table, such as first BTB table 401, and as described above in relation to LE 605 of FIG. 6. In FIG. 8, BR1LBIAS 807 indicates whether there is local bias for Branch1. PAIR 808 is used as further described elsewhere herein. The BRTYPE 809 for the third branch-type BTB entry 800, according to some embodiments, is encoded as described for BRTYPE for other BTB tables such as for the first BTB entry 600. BR1END 810 for the third branch-type BTB entry 800 is a branch end pointer for Branch1 that is incremented by one with a range of [5:0]. BR0LBIAS 811 indicates whether there is local bias for Branch0. BREND 812 and BRTGT 814 are used for storing one or two branch targets for Branch0 and Branch1, respectively, in connection with fields USEOA, OAIDX, BROEND, BR1TGT, and BROTGT from a first BTB table such as first BTB table 401. The numbers of bits (widths) and positions described in reference to the first, second, and third branch-type BTB tables 401-403 and respective BTB entries 600, 700, 800 are by way of example only. Other numbers of bits and positions for the described fields or other variables or fields are possible when implementing multiple BTB tables in a processor or system.

In terms of an illustrative multiple BTB table replacement policy, the following is provided as one of several possible embodiments. In this embodiment, a first level 1 BTB table first accepts all BTB entries until one or more of a set of entries is full where a set in this example refers to a set of a set-associate group of entries. In another example, the first level 1 BTB table first accepts all BTB entries until the level 1 BTB table is full. Then, as the processor or processor core operates, BTB entries are evicted to one of a plurality of level 2 BTB tables that are designed based on target address size or branch type such as the BTB tables 301-303 of FIG. 3 and the BTB tables 401-403 of FIG. 4, respectively. For example, a replacement policy is full LRU for each level 2 BTB table such as the BTB tables 301-303 of FIG. 3 and the BTB tables 401-403 of FIG. 4. The branch-type BTB replacement policy supports marking entries as either least recently used (LRU) or most recently used (MRU). A way of a set is marked as LRU after the way is cleared so that the next time a new BTB entry is written to that set, the vacated entry is replaced and no valid entry is overwritten. A way is marked as MRU after the way has been installed so that the way goes to the back of a queue for replacement. Table 1 below details the cases where level 1 refers to a level 1 memory and level 2 refers to a level 2 memory, and so forth:

TABLE 1

| EVENT | NEW VALUE | UPDATE |
|---|---|---|
| Level 2 BTB hit (Level 1 BTB miss) | MRU | Update hit entry if replaced with Level 1 BTB victim |
| Level 2 BTB hit (Level 1 BTB miss) | MRU | Update Level 2 location for Level 1 BTB victim if different from Level 2 BTB hit location |
| Level 2 BTB hit (Level 1 BTB miss) | LRU | Update hit entry if not being replaced with Level 1 BTB victim (also invalidate hit entry in Level 2 BTB) |
| Level 1 BTB and Level 2 BTB hit | LRU | Update Level 2 location if hit in Level 1 BTB and Level 2 BTB (also invalidate hit entry in Level 2 BTB) |
| Train check | MRU | Update Level 2 BTB location for evicted Level 1 BTB entry |

The following description provides further details in relation to pipeline operation according to some embodiments. The branch-type BTB is read for every prediction flow unless canceled by a power filter. The read is initiated in a first position BP0 and redirects from BP4 to BPN1 where N refers to a subsequent cycle. The pipeline timing of a level 1 BTB miss/level 2 BTB hit swap case is shown in Table 2 below. Both a victim way from the level 1 BTB and a hit way from the level 2 BTB are recorded. The victim way can have a different level 2 BTB table and bank from the hit way, which requires special consideration. For example, the level 2 victim bank is chosen based on the LRU state and overwritten. A write to the level 1 BTB and level 2 BTB occur with a write enable (WrEn) signal asserted in BP4 with actual write in position BP5.

TABLE 2

| BP0 | BP1 | BP2 | BP3 | BP4 | BP5 |
|---|---|---|---|---|---|
| — | — | Level 1 BTB Miss | Level 2 BTB Hit | Level 1 BTB WrEn | Wr to Level 1 BTB |
| — | — | Level 1 | — | Level 2 | Wr to Level |

TABLE 2-continued

| BP0 | BP1 | BP2 | BP3 | BP4 | BP5 |
|---|---|---|---|---|---|
| | | BTB Victim | | BTB WrEn | 2 BTB |

The following description provides further details in relation to level 2 BTB physical organization in a processor such as processor 400 in FIG. 4 according to some embodiments. A first level 2 BTB table includes 512 sets with 4 ways, 36 bits per entry, 2 macros per set, a macro type of 72b, and a total of 8 macros. A second level 2 BTB table includes 256 sets with 4 ways, 64 bits per entry, 4 macros per set, a macro type of 64b, and a total of 8 macros. A third level 2 BTB table includes 512 sets with 5 ways, 72 bits per entry, 5 macros per set, a macro type of 72b, and a total of 20 macros.

One or more upper bits of index are used as a read enable so that only half of a macro is read per way for the first level 2 BTB table and one macro is read per way for the second and third level 2 BTB tables. Since the first and third level 2 BTB tables have twice as many sets as a level 1 BTB table such as level 1 BTB table 401 of FIG. 4, the lower bit of a tag is used as the index most significant bit (MSB) for these BTB tables so that the BTB tables only need to store a 12-bit tag.

In embodiments of processors for a relatively small client device or a mobile phone, use of multiple branch-type BTB tables has a high power cost relative to performance, so additional methods can be performed to reduce power consumption. For example, static methods include power gating the level 2 BTB tables for some or all of the time and clock gating the level 2 BTB tables for some or all of the time. In each step, the level 2 BTB enable function can be set such as by a BIOS or a fuse. Dynamic methods to reduce power consumption include power gating the level 2 BTB tables adaptively with extra control that recognizes when a particular level 2 BTB table is needed. Another dynamic method includes adapting an application executed by an operating system, firmware, or so forth such that the application adapts its use of level 2 BTB tables depending on a preferred use of power by the application or depending on a power setting of the operating system, the firmware, or the device on which the application is active.

The following description provides further details in relation to an overflow address buffer for use by a plurality of BTB tables, such as the first BTB table 301, the second BTB table 302, and the third BTB table 303 of FIG. 3, and corresponding analogous tables in FIG. 4. In order to support branches of target size up to 49 bits without having to store every bit in the prediction structures, an overflow address buffer is provided in the processor. The overflow address buffer is used to store a certain number of bits such as, for example, a top or a set of 17 bits of a branch target address. According to some embodiments, the top 17 bits referenced by a predictor structure such as a BTB table is through a pointer into the overflow address buffer, thus saving storage space in the BTB table. The overflow address buffer is used when needed to store a large number of target address bits. According to testing, trace analysis shows that for a given trace, a top 17 bits of fetch address only take a limited number of values for the various branches in a set of instructions.

According to some embodiments, an overflow address (OA) buffer includes 32 entries, each entry containing a single field for a virtual address in a position in the BTB entry at position [48:32] as described herein. Each overflow address buffer entry is shared between threads. At predict time, the overflow address buffer provides the top 17 bits of address to the BTB based on a 5-bit pointer that the BTB provides. It is possible that the overflow address buffer entry used at predict time has been overwritten since the pointer was recorded in one of the predictors. In such case, the prediction is wrong and is redirected which causes the predictor to be corrected. Different predictors read the overflow address buffer in different stages of the prediction pipe, thus requiring multiple simultaneous reads out of the overflow address buffer.

An overflow address buffer is allocated during training of a BTB as follows. Training first determines whether a branch target differs from the current address for the range [48:32] in which case the overflow address buffer is needed. If the overflow address buffer is needed, the current overflow address buffer entries are compared against the target address at position [48:32] to determine whether an overflow address buffer entry already includes the desired target address at position [48:32]. On a match, the overflow address buffer index that matches gets recorded in the predictor BTB table. If no overflow address buffer entry matches the target at position [48:32], a new entry gets allocated in the overflow address buffer using a full LRU replacement policy. According to some embodiments, training writes are speculative and some overflow address buffer entries may get allocated that are never useful because they were allocated while on a bad path.

The following description provides further details in relation to BTB training. When a prediction gets redirected (such as at the decode and execution stages of the prediction pipeline), a BTB table is updated by a training algorithm to improve prediction accuracy at the prediction address when the prediction is encountered again in the program sequence. When a redirect is received, the redirect type, branch target, and EndAddr from a redirect source, along with the prediction branch type, branch target, EndAddr, and other states from the prediction history buffer, are used to determine what kind of training/update action is required.

The following redirect cases require training a BTB table or set of BTB tables. Case 1: a branch predicted taken did not match any branch corresponds to invalidating the BTB entry used at prediction. Case 2: no branch predicted corresponds to training the newly found branch in the BTB. Case 3: redirected branch EndAddr does not match EndAddr of any predicted branch and corresponds to training a newly found branch in the BTB. Case 4: redirected branch EndAddr matches EndAddr of a predicted branch but does not match Type and corresponds to updating the branch type in the BTB. This fourth case includes cases when the branch type needs to be changed to mark a branch as dynamic or variable.

The BTB training process is done through a training pipe. Each thread is associated with a mispredict register that captures information about the last redirect seen for the thread and indicates whether a BTB update is requested. The training pipe picks between the two threads based on requests and arbitrates through round robin in case of request conflicts that occur when both threads request BTB training simultaneously. In general, training for one thread can start while the other thread is already in the training pipe. However, a thread cannot be picked if the other thread is currently being trained for the same BTB index and does not update the BTB table in time to be visible by the second training at the same index. BTB training happens speculatively and redirects occurring on the wrong path can cause BTB updates. However, if the mispredict register gets overwritten, training that is in progress for the thread is canceled.

The training pipe starts in cycle BTN2 where the training request is granted, followed by cycle BTN1, cycle BT0, cycle BT1, cycle BT2, cycle BT3, cycle BT4 and completes in cycle BT5 where the BTB is written. According to some embodiments, only the first BTB table, such as first BTB table 401 of FIG. 4, gets updated with new or modified entries. The training pipe initiates a train-check-read (TCR) process which stalls the prediction pipe for one cycle. One purpose of the TCR process is to find out whether an entry currently exists in the level 1 BTB or one of the level 2 BTB tables at the training lookup location. If a match is found in a level 2 BTB table, the TCR process triggers a swap between the level 2 BTB and the level 1 BTB, after which the training flow is repeated.

Following the TCR process that does not hit in a level 2 BTB, different training tasks are handled as follows. Invalidations are performed only when the TCR hits. For new writes and updates, the BTB update training merges the mispredicted branch with the BTB entry hit, creates a new BTB entry, or performs both of these actions. The different scenarios are as follows. When the TCR process misses in the level 1 BTB, a new BTB entry is created at the lookup address such as by selecting the way based on a replacement policy and evicting the selected entry to a level 2 BTB if applicable. In some embodiments, the TCR process checks over entries of all three of three levels of BTB tables when considering misses and performing subsequent steps as described herein.

When the TCR process hits in the level 1 BTB, such getting a hit in a BTB table, there is an existing BTB entry at the lookup address, meaning that there are one or two branches already in this BTB entry. If the training task is an update, the mispredict EndAddr matches one of the branches found. Otherwise, a new branch needs to be introduced. There are up to three branches that need to be written back in the BTB. These branches are ordered based on EndAddr and labeled as Pos0, Pos1 and Pos2. The following cases are handled as follows. Case 1 occurs when only Pos0 is valid. Training the Pos0 branch is then performed at the TCR lookup address. Case 2 occurs when only Pos0 and Pos1 are valid. If Pos0 and Pos1 branches can be paired, training the pair is then performed at the TCR lookup address. Otherwise, Pos0 alone is trained at the TCR lookup address as "non-last" in prediction window (NLIPW) and a new training flow for Pos1 is initiated at a Pos0EndAddr+1 lookup address when Pos1 is the mispredicted branch. If Pos1 is not the mispredicted branch, training is dropped. Case 3 occurs when Pos0, Pos1 and Pos2 are valid. If Pos0 and Pos1 branches can be paired, the pair at TCR lookup address is trained as NLIPW and a new training flow is initiated for Pos2 at Pos1EndAddr+1 lookup address if Pos2 is the mispredicted branch. If Pos2 is not the mispredicted branch, it is dropped. Otherwise, the Pos0 alone is trained at the TCR lookup address as NLIPW. If Pos0 is not the mispredicted branch, a new training flow is initiated at a Pos0EndAddr+1 lookup address for the mispredicted branch. Again, Pos1, Pos2, or both Pos1 and Pos2 are dropped.

The above-described training process attempts to keep all branches before the mispredicted branch and install the mispredicted branch with TCR flows. Each redirect is restricted to trigger no more than two training flows so the mispredicted branch is not guaranteed to be trained. However, marking the entries NLIPW causes the next prediction to break the prediction window into several predictions so that the new branch can be trained eventually. The TCR flow at each lookup address triggers a level 1/level 2 BTB swap and causes the TCR flow to replay. Consequently, up to four TCR flows can happen for a given redirect.

Figure 9:
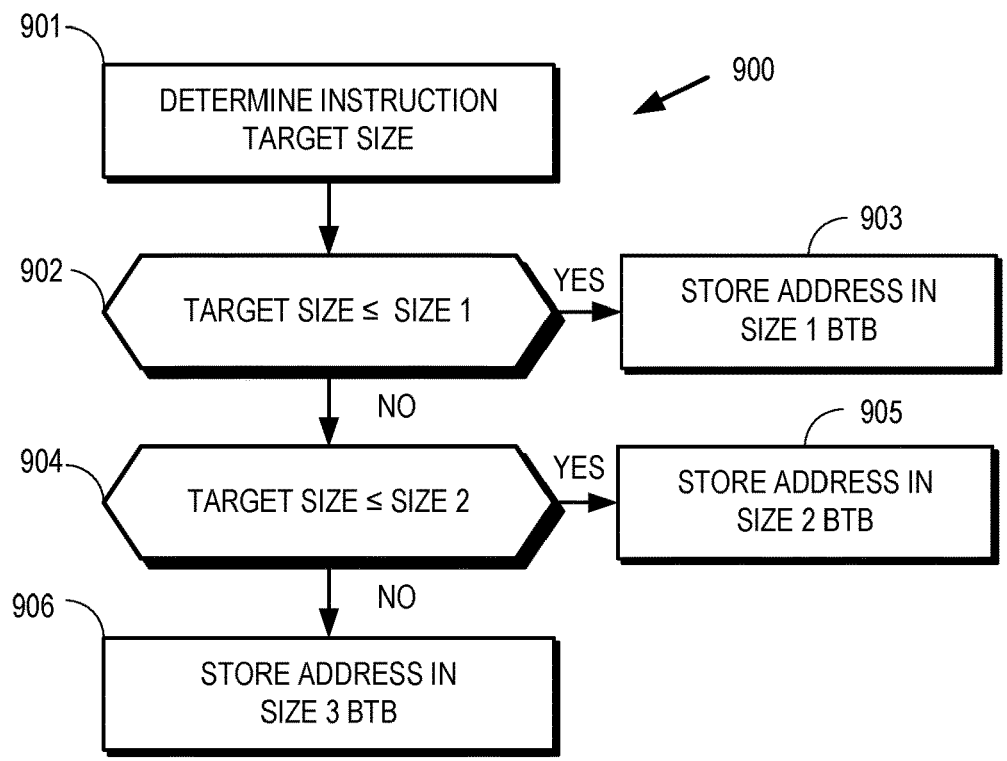
FIG. 9 is a flow diagram illustrating a method for storing a branch target address into one of a plurality of BTB tables by target address size in accordance with some embodiments.

FIG. 9 is a method 900 for storing a branch target address into one of a plurality of BTB tables by target address size in accordance with some embodiments. The method 900 is implemented in some embodiments of the instruction pipeline architecture 100 shown in FIG. 1, in some embodiments of the processing system 200 shown in FIG. 2, and in some embodiments of the processor 300 of FIG. 3. In the illustrated embodiment, processor instructions are being executed or are allocated or scheduled for execution on one or more processor cores in a processing system such as the processor core 305 in the processor 300 shown in FIG. 3. As discussed herein, the processor instructions include a branch instruction.

At block 901, BTB training logic determines an instruction target address size by comparing a target address to a prediction address of the branch instruction. Based on the target address size, the method includes determining or selecting which one of a plurality of size-based BTB tables in which to store the predicted target address. For example, at block 902, the processor determines whether the target size is less than or equal to a first size "SIZE 1." If so, at block 903, the processor stores the BTB entry in a first size-based BTB entry of a size-based BTB table such as the first BTB table 301 of FIG. 3. If not, at block 904, the processor determines whether the target address size is less than or equal to a second size "SIZE 2" for a three-size BTB system. If so, at block 905, the processor stores the branch target in a second size-based BTB table. For example, the target address is stored in the second BTB table 302 of FIG. 3. If the branch instruction type is not less than or equal to the second size "SIZE 2" at block 904, the processor stores the branch target in a third size-based BTB at block 906.

Figure 10:
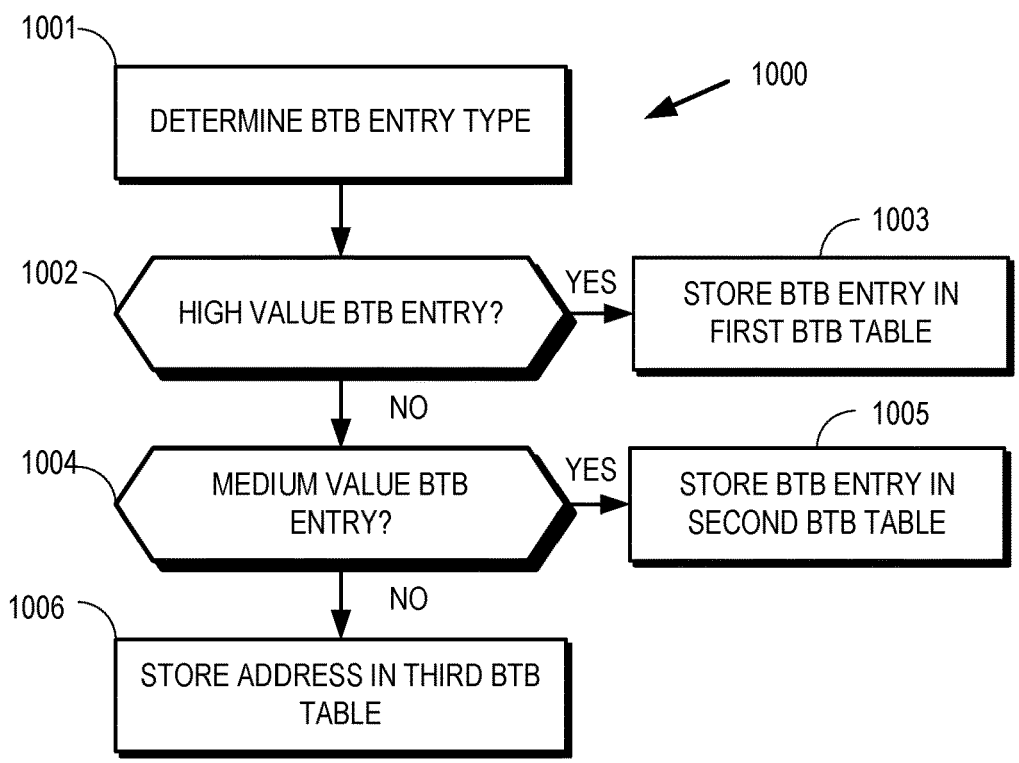
FIG. 10 is a flow diagram illustrating a method for storing a branch target address into one of a plurality of BTB tables by branch type in accordance with some embodiments.

FIG. 10 is a method 1000 illustrating a method for storing a branch target address into one of a plurality of BTB tables by branch type in accordance with some embodiments. The method 1000 is implemented in some embodiments of the instruction pipeline architecture 100 shown in FIG. 1, in some embodiments of the processing system 200 shown in FIG. 2, the processor 400 of FIG. 4, and in the processor 500 of FIG. 5. In the illustrated embodiment, processor instructions are being executed or are allocated or scheduled for execution on one or more processor cores in a processing system such as the processor core 405 in the processor 400 of FIG. 4. As discussed herein, the processor instructions include a branch instruction.

The method 1000 is described in the example context of a three BTB table system. At block 1001, a processor determines a BTB entry type for a conditional instruction. Based on the branch instruction type, at block 1002, the processor determines whether the branch instruction type is a high value BTB entry for the BTB table system. If so, at block 1003, the processor stores the BTB entry in a first BTB table such as BTB table 401 of FIG. 4. If not, at block 1004, the processor determines whether the branch instruction type is a medium value BTB entry. If so, at block 1005, the processor stores the BTB entry in a second BTB table such as BTB table 402 of FIG. 4. If not, at block 1006 the processor stores the BTB entry including an address in an entry of a third BTB table such as BTB table 403 of FIG. 4.

With respect to high value, medium value, and so forth, a conditional branch instruction that is a certain type may be a high value, medium value, or other type of BTB entry. For example, a jump type may be a high value entry, and a return type instruction may be a medium value entry. According to some embodiments, a value of an entry corresponds to an entry that saves a plurality of processor cycles relative to not keeping the entry or relative to other possible entries that may be saved in a BTB or BTB table. If the branch instruction is valuable, such as being useful in a future process cycle, the processor stores the branch target in a BTB table. For example, the target address is stored in one of the type BTB tables 401-403 of FIG. 4. If the branch instruction type is not a useful branch type, the processor does not store the target address in a BTB table entry.

In some embodiments, the apparatus and techniques described above are implemented in a system including one or more integrated circuit (IC) devices (also referred to as integrated circuit packages or microchips), such as the systems, processors, and BTB tables described above with reference to FIGS. 1-7. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. Therefore, the particular embodiments disclosed above may be altered or modified and all such variations are considered within the scope of the disclosed subject matter. Accordingly, the protection sought herein is as set forth in the claims below.

What is claimed is:

1. A method comprising:
   determining a branch characteristic of a branch target buffer (BTB) entry based on redirects caused by mispredictions for a branch instruction; and
   based on the determined branch characteristic of the BTB entry, storing the BTB entry in one of:
      a first entry of a first branch target buffer (BTB) table of a processor, the first entry having a first target address width corresponding to a first branch characteristic; and
      a second entry of a second BTB table of the processor, the second entry having a second target address width different from the first target address width corresponding to a second branch characteristic different than the first branch characteristic.

2. The method of claim 1, wherein the branch characteristic is a branch target address size.

3. The method of claim 1, wherein the branch characteristic is a branch type.

4. The method of claim 3, wherein the branch type is one of a jump branch instruction, a call branch instruction, a return branch instruction, and a conditional branch instruction.

5. The method of claim 1, wherein the branch characteristic is a number of branches stored in the BTB entry.

6. The method of claim 1, wherein the branch characteristic is a thread identifier of the BTB entry.

7. The method of claim 1, wherein the storing of the BTB entry is performed by a prediction trainer unit of a processor.

8. The method of claim 1, further comprising:
   identifying a BTB entry of the first BTB table or the second BTB table based on a recently used status bit marking the BTB entry as one of a most recently used (MRU) status and a least recently used (LRU) status within a set; and
   evicting the identified BTB entry of the first BTB table or the second BTB table prior to storing the entry therein.

9. The method of claim 1, wherein:
   the first BTB table and the second BTB table are included in a same memory level cache of the processor.

10. The method of claim 1, further comprising:
    prior to storing the BTB entry, searching at least one of the first BTB table and the second BTB table based on an instruction tag of the branch instruction; and
    prior to storing the BTB entry, identifying that BTB entry is not found in the at least one of the first BTB table and the second BTB table.

11. The method of claim 1, further comprising:
    storing overflow bits of a target address of the BTB entry in an overflow BTB table when a size of the target address of the BTB entry exceeds an address size for BTB entries of the respective first BTB table or the second BTB table.

12. A method, comprising:
    storing first branch target addresses at a first branch target buffer (BTB) table having a first number of first BTB table entries, each first BTB table entry including a first tag and a first target address, each first target address having a first width;
    storing second branch target addresses at a second BTB table having a second number of second BTB table entries, each second BTB table entry including a second tag and a second target address, each second target address having a second width different from the first width;
    selecting one of the first BTB table and the second BTB table to store branch descriptors associated with a branch instruction based on a branch characteristic of the branch instruction.

13. The method of claim 12, wherein the branch characteristic is a branch target address size.

14. The method of claim 12, wherein the branch characteristic is a branch type.

15. The method of claim 14, wherein the branch type is at least one of a jump branch instruction, a call branch instruction, a return branch instruction, and a conditional branch instruction.

16. The method of claim 12, wherein the branch characteristic is a number of branches stored in the BTB entry.

* * * * *